United States Patent [19]

McKenzie

[11] 3,747,587
[45] July 24, 1973

[54] SNOW AND ICE MELTING DEVICE

[76] Inventor: Robert L. McKenzie, No. 45, 5619-105th St., Edmonton, Alberta, Canada

[22] Filed: Nov. 8, 1971

[21] Appl. No.: 196,371

[52] U.S. Cl................................. 126/343.5 R
[51] Int. Cl.................... E01c 11/24, E01h 5/00
[58] Field of Search.............................. 126/343.5

[56] References Cited
UNITED STATES PATENTS
2,877,762 3/1959 Flynn ........................... 126/343.5 R
3,123,922 3/1964 Spinelli ........................ 126/343.5 R Primary Examiner—Edward G. Favors
Attorney—Richard K. Stevens, William A. Knoeller et al.

[57] ABSTRACT

A device for melting frozen water comprising a melting chamber, inlet means in said chamber for introducing said frozen water therein, a heat exchanger disposed in said chamber and arranged to heat water in which said frozen water is at least partially submerged, means for withdrawing water from said chamber, heating means for heating a heat transfer fluid and means for recirculating said heat transfer fluid between said heating means and said heat exchanger.

5 Claims, 1 Drawing Figure

Patented July 24, 1973 3,747,587
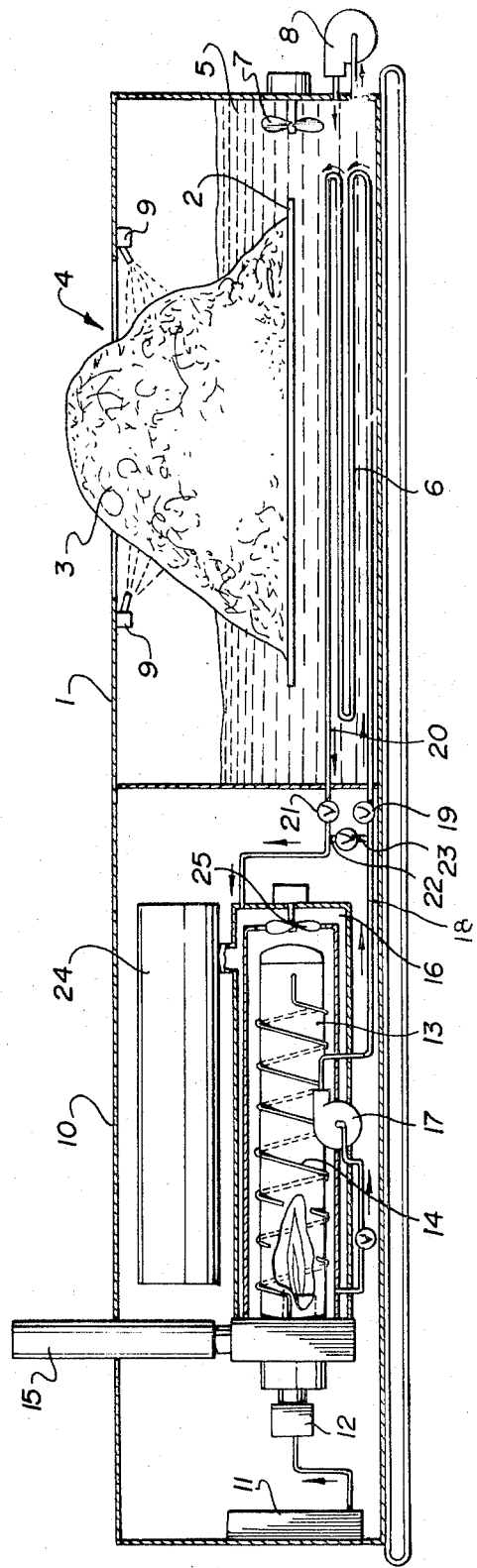

SNOW AND ICE MELTING DEVICE

The present invention relates to a device for melting frozen water and in particular snow, ice and mixtures thereof as well as a method of melting such frozen water using said device to produce water for industrial or commercial use or potable water for human consumption.

One of the most critical problems encountered in remote cold climatic localities is the shortage of fresh water. In such areas, fresh waters may or may not be available at all or may be available for only short periods of time. Fresh water may be available in abundance, but the cost of obtaining it may make it too expensive. A typical area where this situation exists is the Canadian north and in Alaska.

During summer months, fresh water is obtained by damming up rivers, streams or from nearby lakes or ponds. Obtaining water from these supplies to storage facilities is not a great problem. However, when the summer is over and fall sets in, these small rivers, streams, lakes and ponds freeze to the bottom. The problems encountered in drilling a fresh water well through the permafrost or muskeg make this method of obtaining water too expensive. Air and ground transportation in the winter months is also very expensive and sometimes impossible. The only other source of fresh water is from snow and ice which is pletiful during the winter months and attempts have been made to provide devices for melting snow and ice to produce fresh water. Such attempts are disclosed for example in Canadian Pat. Nos. 830,788, 825,952, 808,977, 780,673, 769,461 and 741,952. However, all these methods suffer from disadvantages.

In particular, in the methods of Canadian Pat. Nos. 769,461 and 780,673 hot combustion gases are percolated through water in a melting tank, However when contact of the combustion gases with the water is made, any unburned fuel is extinguished by the water and the unburned fuel will then contaminate the water and make it unfit for human consumption. The efficiency of the melting is also lowered when this occurs because not all of the possible energy has been released from the fuel for use in melting the snow and ice. If combustion is complete before the combustion gases are percolated through the water, the combustion gases will also contaminate the water with any harmful residues that the combustion gases contain.

In Canadian Pat. No. 825,952 the snow and ice which are to be melted are fed to a tank having a heat exchanger submerged in water. However, in the apparatus of the Canadian patent, the heat exchanger is a combustion chamber heat exchanger. Combustion of the fuel and air mixture occurs as it flows throught the combustion chamber heat exchanger and inside the combustion chamber heat exchanger where this combustion takes place temperatures as high as 1,2000°–2,000°F. are attained in the hotest area. At temperatures in this range, the temperature of the outer surface of the combustion chamber heat exchanger contacting the water will be substantially higher than 212°F., i.e. the boiling point of the water in which the heat exchanger is immersed. With this high temperature localized boiling of the water at the heat exchanger surface will occur and when this occurs, the efficiency of the heat exchanger is lowered. Further it is found that dissolved and suspended material in water will deposit out of the water when the water is in the temperature range 140° to 212°F. and usually on surfaces that are hotter than the water. Thus in operation of the device of Canadian Pat. No. 825,952 the bulk temperature of the water may be much below this temperature range, the water adjacent to the combustion chamber heat exchanger surface, the water will be in the aforesaid critical range and the suspended and dissolved material will deposit out onto the outside of the combustion chamber heat exchanger reducing the transfer of heat from the combustion gases to the water. These deposits are usually good stable unsulators and quite permanent and once the deposit begins high temperatures will be experienced further down the combustion chamber heat exchanger where initially the combustion gases were not hot enough to cause localized boiling. Thus the deposits will propagage on the outside of the combustion chamber heat exchanger as the high combustion temperatures are moved further down the combustion chamber. Canadian Pat. Nos. 830,788 and 808,977 also use direct fired heat exchangers for transferring the heat to the water.

The present invention provides a device for melting frozen water such as ice and snow, in which neither the heat transfer fluid or the combustion gases contact the water and in which the problems of low heat exchange efficiency and deposition on the heat exchanger are substantially reduced. It has now been found that the above advantages can be obtained by the use of a heat transfer fluid which is continuously recirculated between a heating unit in which heat is transferred from a heating source to the heat transfer fluid and then to a heat exchanger located in the water in which the snow and ice to be melted is deposited. With such a system good quality long lasting and expensive heat transfer fluid may be economically used as substantially none of it is lost in the system, and further localized boiling in the water adjacent the heat exchanger is substantially reduced and solids deposition from the water onto the heat exchanger is also substantially reduced.

According to the present invention therefore there is provided a device for melting frozen water comprising a melting chamber, inlet means qn said chamber for introducing said frozen water, a heat exchanger disposed in said chamber and arranged to heat water in said chamber, in which water said frozen water is at least partially submerged, means for withdrawing water from said chamber, heating means for heating a heat transfer fluid and means for recirculating said heat transfer fluid between said heating means and said heat exchanger.

In a preferred embodiment of the present invention and to increase the efficiency of the melting of the frozen water, i.e. the snow, ice or mixes thereof, the frozen water in the chamber is maintained spaced from the bottom of the chamber, the heat exchanger being disposed beneath said holder means, This allows the heat to be introduced into the water beneath the frozen water to be melted, thus allowing the heat to rise in the water under natural convection, and further avoids the frozen water contacting the heat exchanger thus avoiding any stress due to the weight of the frozen water on the heat exchanger. To further increase the efficiency of the melting of the frozen water, forced convection is introduced into the water such as by an impeller or a hydraulic agitator in the melting chamber. Further, water may be sprayed onto the frozen water, the water suitably being obtained from the chamber which again increases the efficiency of melting.

The heating means according to one embodiment of the present invention is suitably a unit generally referred to as a dry tube heating unit where the hot combustion gases are enclosed in the fire box and flues and suitably comprises a combustion chamber for burning fuel and air and an outer jacket for containing a heat transfer fluid surrounding the combustion chamber, conduit means being arranged between the heat exchanger and the jacket, which includes a pump means for pumping the heat transfer fluid through the heat exchanger, however it will be realized that any suitable heating means may be provided such as a unit generally referred to as a wet tube heating unit, where the heat transfer fluid is circulated inside the tubes and the hot combustion gases are outside.

The present invention will be further illustrated by way of the accompanying drawing which is a schematic representation of a device for melting snow and ice according to a preferred embodiment of the present invention. Referring to the drawing, the device comprises a melting chamber 1 having disposed therein a holder plate 2 upon which the ice and snow 3 is supported on introduction thereof into the chamber 1 through inlet aperture 4. The holder plate 2 is totally immersed and the ice and snow 3 is partially immersed in water 5 which has been suitably generated by prior melting of snow and ice 3 in the chamber 1 or may be obtained from some other source. Disposed beneath the holder plate 2 and in the water 3 is the heat exchanger 6 through which a hot heat transfer fluid is passed to heat the water 5 and thus melt the snow and ice 3 on the holder plate 2. It will be noted that the holder plate 2 prevents the snow and ice 3 from contacting the heat exchanger 6 and thus prevents excessive stress on the heat exchanger 6 due to the weight of the snow and ice 3, and further provides for better natural convection of the water. In order to increase the efficiency of melting of the snow and ice 3 the water 5 is agitated by an impeller 7 or a hydraulic agitator 8 or both which causes forced convetion in the water 5, and further the snow and ice 3 is sprayed with water from nozzles 9 obtained from that in the chamber 1 by means of a pump and conduits (not shown). The heat transfer fluid is heated in a heating unit 10 which is integral with the melting chamber 1. In the heating unit 10 fuel from the tank 11 and air is mixed in chamber 12 and the mixture is burned in combustion chamber 13, the combustion gases from the combustion chamber 13 passing through flue 14 to a stack 15 from whence they are discharged to the atmosphere. Surrounding the combustion chamber 13 and flue 14 is a jacket 16 containing the heat transfer fluid which is thus heated by the combustion gases in the chamber 13 and flue 14. The heated heat transfer fluid in the jacket 16 is pumped by pump 17 via conduit 18 and valve 19 to the heat exchanger 6 where it heats the water 5 and is returned via conduit 20 and valve 21 to jacket 16 for reheating. A bypass conduit 22 and valve 23 is provided such that heat exchanger 6 may be bypassed if desired. In order to allow for expansion of the heated heat transfer lfuid in the jacket 16 the jacket 16 is placed in communication with an expansion tank 24 and to increase the heat exchange efficiency in the jacket 16 the heat transfer fluid is agitated by impeller 25. The device of the present invention is mounted on a skid 26 and is easily transported on common carriers.

In operation of the device of the present invention the heat transfer fluid comes into contact with very high temperatures in the heating unit 10. The heat transfer fluid is suitably one which has substantially no dissolved or suspended material therein and no substantial deposition takes place. The heat transfer fluid may be one which does not change phase (liquid/gas). It has a sufficiently high boiling point that localized boiling does not occur. Again the heat transfer fluid may be one that has a phase change (i.e. water to steam) the water being first treated to remove dissolved and suspended materials. The heat transfer fluid in the device is not allowed to reach temperatures which will cause localized boiling or solids deposition in the heat exchanger 6, i.e. the water in the jacket 16 adjacent the heat exchanger 6 is not allowed to reach the critical temperature range which causes such solids deposition.

The embodiments of the invention in which an exclusive property or privilege is claimed are drfined as follows:

1. A device for melting frozen water comprising a melting chamber, inlet means in said chamber for introducing said frozen water therein, a heat exchanger disposed in said chamber and arranged to heat water in which said frozen water is at least partially submerged, a holder means adapted to hold said frozen water in said chamber spaced from the base thereof, said heat exchanger being disposed beneath said holder means, whereby said frozen water is melted only by contact with heated water, means for withdrawing water from said chamber, heating means for heating a heat transfer fluid and means for recirculating said heat transfer fluid between aid heating means and said heat exchanger.

2. A device as claimed in claim 1 in which the heating means comprises a combustion chamber for burning of fuel and an outer jacket for containing the heat trasfer fluid surrounding said combustion chamber, said recirculating means including conduit means between said heat exchanger and said jacket and pump means for pumping the heat transfer fluid through said heat exchanger.

3. A device as claimed in claim 1 in which the melting chamber includes spray means adapted to spray heated water onto the frozen water.

4. A device as claimed in claim 1 including agitation means disposed in said chamber adapted to agitate the water in the melting chamber.

5. A method of melting frozen water which comprises at least partially submerging said frozen water in a reservoir of water, heating said water in said reservoir by heat exchange with a hot heat transfer fluid, melting said frozen water in said reservoir solely by contact with heated water, withdrawing water from said reservoir and continuously recirculating the heat transfer fluid between a source of heat where said heat transfer fluid is heated and said reservoir where said fluid is cooled in heat exchange with the water.

* * * * *